United States Patent
Leaming

(10) Patent No.: US 6,752,321 B1
(45) Date of Patent: Jun. 22, 2004

(54) SMART CARD AND METHOD THAT MODULATES MULTI-COLOR LED INDICATIVE OF OPERATIONAL ATTRIBUTES AND/OR TRANSACTIONS BETWEEN THE SMART CARD AND USB PORT OF A USB HOST

(75) Inventor: Taylor J. Leaming, Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/403,853

(22) Filed: Mar. 31, 2003

(51) Int. Cl.[7] .............................................. G06K 19/06
(52) U.S. Cl. ....................... 235/492; 235/441; 235/380
(58) Field of Search ................................ 235/492, 380, 235/375, 441, 449, 382, 379; 710/63, 110, 107, 300, 301, 305

(56) References Cited

U.S. PATENT DOCUMENTS

| | | | | |
|---|---|---|---|---|
| 5,679,945 A | * | 10/1997 | Renner et al. | ............... 235/492 |
| 5,847,372 A | | 12/1998 | Kreft | ........................... 235/492 |
| 6,056,193 A | * | 5/2000 | McAuliffe et al. | ........... 235/380 |
| 6,168,077 B1 | | 1/2001 | Gray et al. | .................. 235/375 |
| 6,202,932 B1 | * | 3/2001 | Rapeli | ......................... 235/491 |
| 6,230,970 B1 | * | 5/2001 | Walsh et al. | ................. 235/379 |
| 6,247,644 B1 | * | 6/2001 | Horne et al. | ................ 235/380 |
| 6,439,464 B1 | | 8/2002 | Fruhauf et al. | .............. 235/492 |
| 6,543,690 B2 | * | 4/2003 | Leydier et al. | ............. 235/451 |
| 6,581,122 B1 | * | 6/2003 | Sarat | .......................... 710/301 |
| 2002/0066791 A1 | | 6/2002 | Leydier et al. | ............. 235/492 |

FOREIGN PATENT DOCUMENTS

| | | | | |
|---|---|---|---|---|
| WO | WO 99/49415 | | 9/1999 | .......... G06K/19/00 |
| WO | WO 01/96990 | | 12/2001 | ............. G06F/1/00 |

* cited by examiner

*Primary Examiner*—Thien M. Le
*Assistant Examiner*—Edwyn Labaze
(74) *Attorney, Agent, or Firm*—Lisa K. Jorgenson; Christopher F Regan

(57) ABSTRACT

A smart card includes a card body and integrated circuit carried by the card body. A microprocessor communicates with a host when the smart card is inserted within a smart card reader. The integrated circuit is operative for driving at least one multi-color light emitting diode (LED) indicative of smart card transactions between the smart card and a USB port of the host and operative for modulating the multi-color LED based on operational attributes of the smart card and/or transactions between the smart card and USB port of the host.

52 Claims, 15 Drawing Sheets

TYPICAL: (SINGLE DATA STAGE PAYLOAD SHOWN)

OR (MULTIPLE DATA STAGE PAYLOADS)

ZERO DATA TRANSACTION (NO DATA STAGE PAYLOADS SENT TO DEVICE):

(SINGLE DATA STAGE PAYLOAD SHOWN)

(MULTIPLE DATA STAGE PAYLOADS)

[ * * * ]

SMART CARD AND METHOD THAT MODULATES MULTI-COLOR LED INDICATIVE OF OPERATIONAL ATTRIBUTES AND/OR TRANSACTIONS BETWEEN THE SMART CARD AND USB PORT OF A USB HOST

FIELD OF THE INVENTION

This invention relates to the field of smart cards, and more particularly, this invention relates to driving a signaling device indicative of smart card transactions between a smart card and USB port of a host.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For example, the die size varies from 1 $mm^2$ to 30 $mm^2$, but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and are a part of everyday usage of a smart card. Eight contacts are located on one side of the card. The smart card performs transactions with a smart card reader using a serial protocol. The mechanical and electrical specifications for a smart card are published by the International Standard Organization (ISO) as ISO7816-X standards, which have allowed the simple and mass produced magnetic stripe cards to evolve toward the smart card. This natural evolution has allowed smart cards, depending of the IC complexity, of course, to perform pre-paid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and answer to reset for synchronous cards are incorporated herein by reference.

In operation, smart card readers are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals. Except for SIM cards, most smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 $mm^2$, and only memories and logic circuits were integrated in the IC. The smart card reader used all eight contacts to interface properly with the different smart card generations. When the smart card was inserted in the payphone, the telephone infrastructure authenticated the smart card and the telephone removed "units" from the smart card.

The banking industry subsequently adopted smart cards. The die size was about 10 $mm^2$, and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 $mm^2$, and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer. Secure message, Public Key Infrastructure, Authentication and Electronic Payment are new smart card areas of interest. The smart card acts as an e-commerce facilitator. One advantage of a smart card compared to other solutions is the smart card PIN located in its memory that is never communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 $mm^2$ to 30 $mm^2$, and the microcontroller and its associated memories and software are integrated in the IC typically with a cryptocontroller. Sometimes, a bio-sensor is integrated. The smart card reader uses at least four or five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires (VBus and ground), and data is carried with the other two wires (D+, D-). The latest version of the USB is currently defined by the Universal Serial Bus Specification Revision 2.0, written and controlled by USB Implementers Forum, Inc., a non-profit corporation founded by the group of companies that developed the USB Specification.

In particular, Chapter 5 USB Data Flow Model, Chapter 7 Electrical, Chapter 8 Protocol Layer and Chapter 9 USB Device Framework of Universal Serial Bus Specification are incorporated herein by reference. The increasingly widespread use of the USB has led smart card reader manufacturers to develop USB interfaces for connection of their products to host computers to complement the existing serial and parallel interfaces.

Although some industries, e.g., banking, have used smart card technology for years, internet users have not taken advantage of smart card technology. Although most internet transactions originate from a PC, and despite PC manufacturer efforts, the PC industry has failed to install on each PC a cost effective smart card reader meeting the specific needs of web related applications. To aid this process, "dual mode" smart cards have been developed.

U.S. Pat. No. 6,439,464 to Fruhauf et al., the disclosure which is hereby incorporated by reference in its entirety, discloses a dual mode smart card IC that operates in a first mode, such as an ISO mode in accordance with International Standards Organization 7816 (ISO) protocol, and a USB mode in accordance with the universal serial bus (USB) protocol. This dual-mode IC is implemented as a smart card and includes a microprocessor, switching block, and external interface.

A voltage supply pad, a ground or reference voltage pad, a first set of pads for the first mode, and a second set of pads for the USB mode, form the interface. The first set of pads preferably includes a reset pad, clock pad and an input/output pad in accordance with the ISO 7816 protocol. The second set of pads preferably includes a D+ pad and a D− pad in accordance with the USB protocol. The IC further includes a mode configuration circuit comprising a USB mode detector connected to at least one of the D+ and D− pads. A pull-up resistor preferably connects to one of the D+ and− pads and a USB voltage detector preferably connects to the voltage supply pad. A latching circuit is connected between the switching block and USB detector, and a control register is connected to the latching circuit for storing a low configuration indicator.

When the dual-mode IC is configured in the USB mode, the first set of pads is disabled based on verification of the USB voltage. When the dual-mode IC is configured in the ISO mode, the second set of pads is disabled after the USB-mode condition is not detected.

Because of the increased use of USB smart card devices, smart card reader manufacturers have developed USB interfaces to connect their products to host computers and complement existing serial and parallel interfaces. As noted before, because of the differences between the serial interface defined by ISO 7816, and the serial interface defined by the USB specification, smart cards have not been directly compatible with this USB specification. Even though the newer smart card reader complexity has been transferred into the host computer, thus reducing overall costs, the USB smart card still requires a pass-through connector and a driver to communicate with the computer. When smart cards have been used with USB devices, it has also been found advantageous to provide a visual indication of any successful data transfers between the host computer and IC module positioned on a smart card.

As disclosed in international WIPO publication WO 02/23357, the disclosure which is hereby incorporated by reference in its entirety, a smart card supports the serial interface defined by the USB specification and allows a user to visualize data flow to and from a smart card. A communication pipe is established between the client software in the host computer and the USB smart card end points.

A USB smart card serial engine captures the downstream traffic and delivers it to a smart card microcontroller. The USB smart card serial engine broadcasts the upstream traffic from the smart card microcontroller to the host computer. Every time a packet transfer occurs without error, the USB smart card serial engine hardware generates a "Correct Transfer" (CTR) flag, resulting in an interrupt. The CTR signal drives a first stage of a 10-bit counter. One output drives an input/output (I/O) buffer connected to an I/O connector pin, which is connected to an LED on a smart card reader or token. The LED blinks at a pace set by the USB traffic. These functions are included in the single IC.

The output of a counter is selected such that a user is provided with a perceptible indication of signaling transaction activity. The LED is driven by the output buffer positioned within the smart card module. This could be a current source circuit connected to a ground (GND) reference voltage or current source circuit connected to a VBus supply voltage. It could also be a switched circuit connected to a VBus supply voltage and a switch circuit connected to a ground reference voltage.

This traffic signaling system as described is permanently tied to a specific function. It cannot change the meaning of the modulated signal to the LED. There is only one correct meaning, i.e., a "correct transfer" has occurred. There is also no mechanism to disable the signal used to drive the LED to conserve energy. In a power-sensitive activity, the power budget should be used sparingly and only when required.

SUMMARY OF THE INVENTION

It is therefore an object of the present invention to overcome the disadvantages as described above to enhance USB traffic signaling recognition beyond signaling that a "correct transfer" has occurred.

The present invention is advantageous and allows at least one multi-color LED to be modulated based on operational attributes of the smart card and/or transactions between the smart card and USB port of the host. The term "smart card" can also refer to smart card modules and tokens as used herein.

In accordance with the present invention, a smart card includes a card body and an integrated circuit carried by the card body. A microprocessor communicates with a host when the smart card is inserted within a smart card reader and is operative for driving at least one multi-color light emitting diode (LED) indicative of smart card transactions between the smart card and a USB port of the host and operative for modulating the multi-color LED based on operational attributes of the smart card and/or transactions between the smart card and USB port of the host.

The card body includes contacts to which the multi-color LED is operatively connected when the smart card is inserted within a smart card reader. The contacts can comprise a reset contact (C2), a clock contact (C3), an I/O contact (C6), or programming power connection Vpp contact (C7) according to the ISO 7816 specification for smart cards. Other contacts on the smart card can have a second multi-color LED operatively connected when the smart card is inserted within a smart card reader.

A microprocessor is also operative for modulating the at least one multi-color LED based on host OUT transactions, IN transactions, USB error conditions, device busy conditions, USB transfer type with the transaction, endpoints, smart card configuration, alternate settings, and vendor specific requests. The microprocessor is also operative for driving the at least one multi-color LED to different colors based on operational attributes of the smart card and/or transactions between the smart card and USB port of the host.

A method and integrated circuit are also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
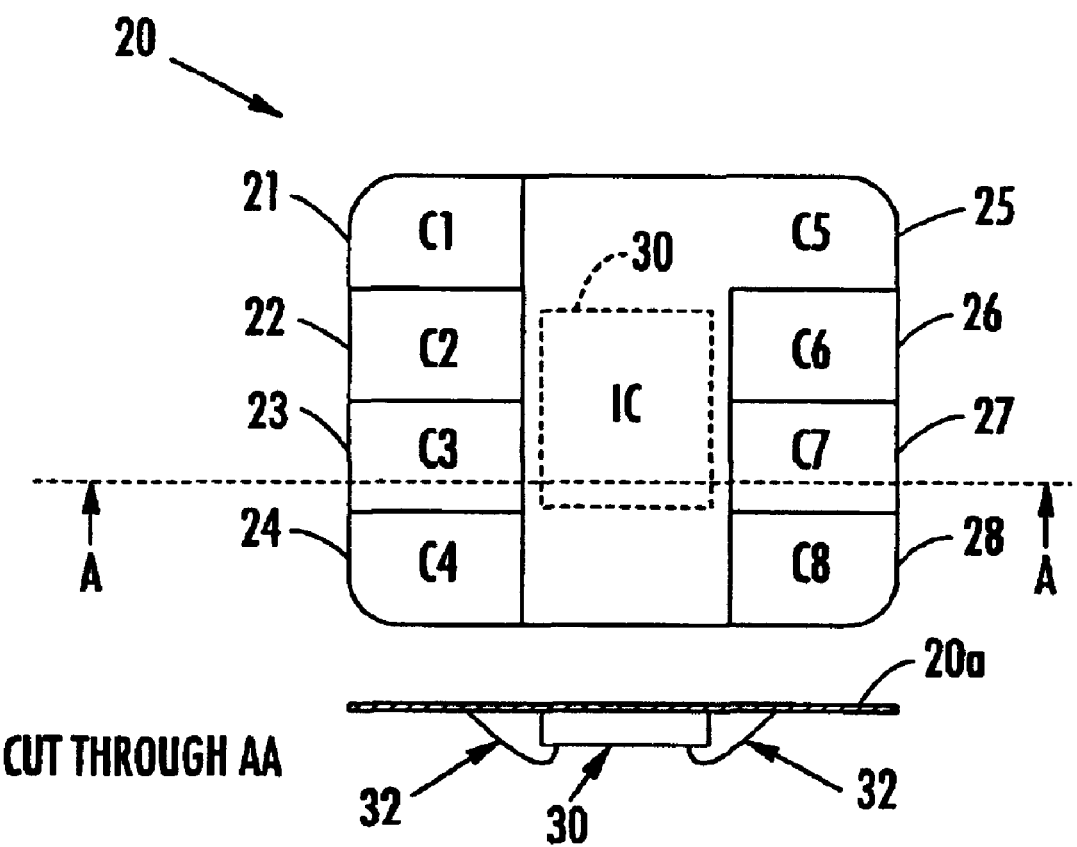
FIG. 1 illustrates a smart card module that is compatible with a USB smart card connecting to a USB serial link.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous over prior art signaling of USB packet traffic, which was limited because it was permanently tied to a specific signal function, i.e., a "Correct Transfer" (CTR) signal, as described in WO 02/23357. The present invention allows an embedded microprocessor and code to present additional information in a visual fashion to an outside observer. It permits enhanced power management, particularly in bus-powered mobile applications, such as USB "on-the-go," GSM, and similar systems. It provides a cost-effective technique for presenting additional value-added information to a user with minimal, additional expense to the silicon and minimal, additional cost to the product. It is advantageous for customers, for example, banks, credit unions and financial services organizations which could personalize smart cards before issuing them to end-users.

The present invention is applicable not only to "dual-mode" (i.e., ISO and USB) smart cards, but also to USB-only smart cards, single mode chip smart card interface (CCID) USB smart cards, and single mode ISO smart cards. In one aspect of the invention, a pre-scale counter is dynamically loaded by the CPU. The IC of the present invention can include masks for host-only traffic, i.e., OUT transfers; device-only traffic, i.e., IN transfers; host plus device traffic, i.e., "correct transfer" (CTR); disable signaling, i.e., power saving signals; bus error, e.g., stall, retries, aborts and similar bus error signals; protocol handshake, such as ACK; device busy, i.e., NAK; transmission mode type, such as control (CTL), bulk (BLK), isynchronous (ISO), and interrupt (INT); end point; configuration; and alternate settings.

The present invention is also advantageous because it can function as a debug and diagnostic tool for hardware designers and software developers. Changing the modulation of visual signaling can provide meaningful patterns indicative of particular circumstances, behaviors, and status of the overall system, including packet transfers, of course. The present invention can be particularly advantageous for customers, such as financial institutions, who issue "personalized" smart cards to an end-user. For example, an end-user can determine when it is appropriate (and safe) to remove the USB smart card device from the USB port on the computer at the conclusion of a transaction. Any accidental removal of the USB smart card device prior to that moment could cause loss of information.

For purposes of description, basic aspects of the method and device for signaling transaction activity between a universal serial bus (USB) smart card module and USB port are set forth as background and a reference for the present invention.

FIG. 1 shows a smart card module 20 that is compatible with ISO 7816-2 Dimension and Location of the contacts. For purposes of description, the term "smart card module" can also refer to a smart card. The smart card module 20 has eight electrical contacts (21–28) positioned on a substrate 20a and an IC 30 attached to the side of the substrate opposite the contacts. These contacts are conventionally referred to by sequence C1, C2, C3, C4, C5, C6, C7 and C8, respectively. The electrical contacts 21–28 are electrically isolated from each other. Electrical connections between the IC 30 and the contacts are accomplished through the use of bonding wires 32. Electrical connections between the opposite sides of the substrate 20a may be accomplished by any means common in the art, including conductive vias. The IC 30 and the bonding wires 32 are normally encapsulated for protection from mechanical and environmental effects.

This smart card module 20 is typically compatible for use in asynchronous ISO 7816 applications. Contact C1 21 is assigned to the supply voltage VCC, contact C2 22 is assigned to the reset signal RST, contact C3 23 is assigned to the clock signal CLK, contact C5 25 is assigned to the GND reference voltage, contact C6 26 is assigned to the variable supply voltage VPP, and contact C7 27 is assigned as data input/output (I/O). In synchronous ISO 7816-10 applications, contact C4 24 is typically assigned to function code FCB and contact C8 28 may also be used for other synchronous applications.

The smart card module 20 as described is also compatible for use in USE applications. In a USB smart card application, contact C1 21 is assigned to the supply voltage VBus, contact C4 24 is assigned to the data line D+, contact C5 25 is assigned to the GND reference voltage, and contact C8 28 is assigned to the data line D−. Contacts C2, C3, C6 and C7 are available for other uses and can be used to report the USB activities between the computer-based application and the USB smart card IC, including traffic signaling.

It should be understood that the protocol used between a smart card and a smart card reader is described by the ISO 7816 standard, but is not embedded in a host computer. When a smart card is inserted in a smart card reader, the smart card module 20 is connected to a smart card first interface using a pass-through connector. The first interface masters the half-duplex ISO 7816 protocol. The smart card reader can be connected to a computer parallel port, serial port or a USB port through a second interface. An LED driven by hardware circuitry in the smart card reader can provide an indication of traffic between the smart card and the computer.

Figure 2:
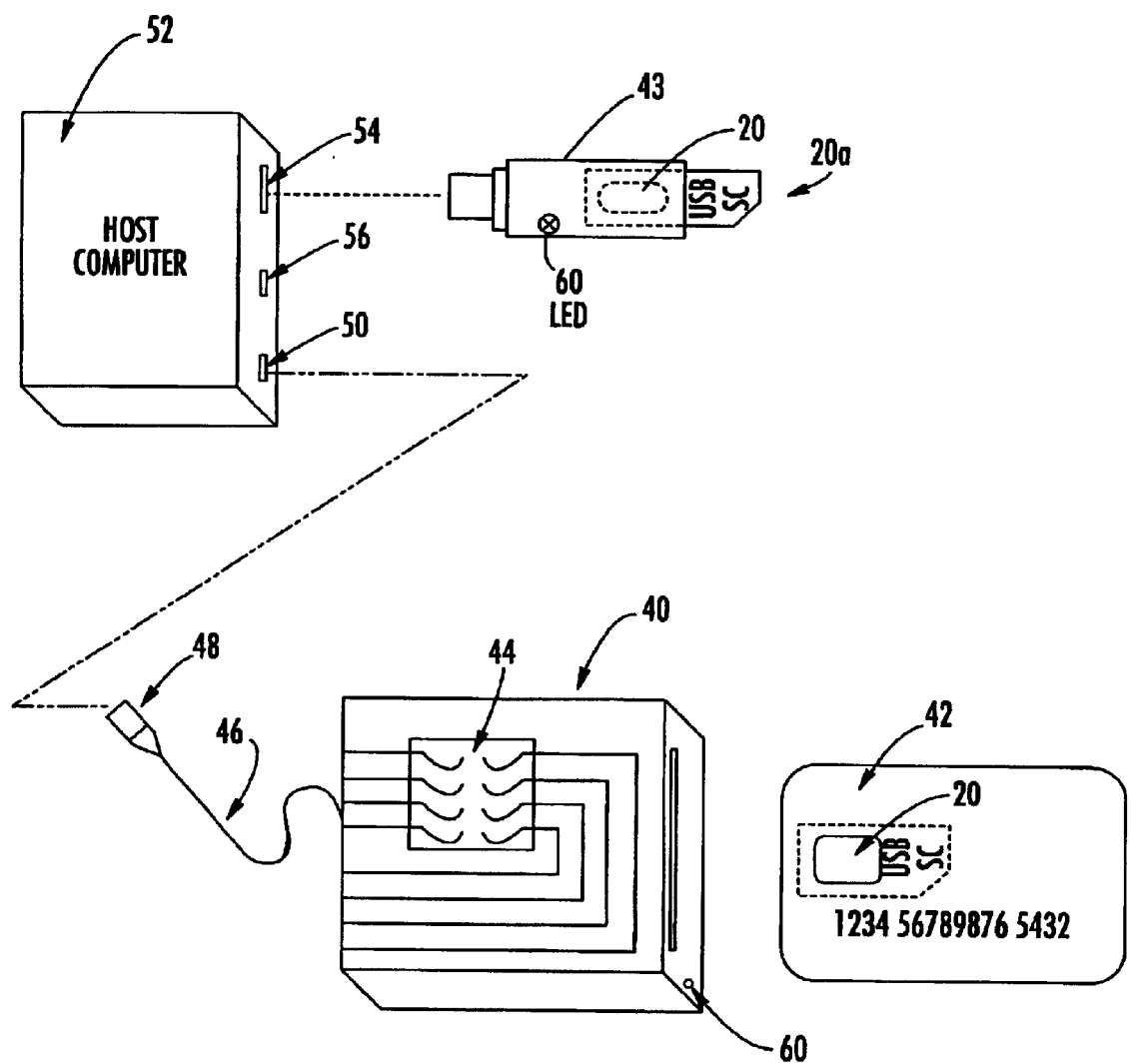
FIG. 2 illustrates a USB smart card reader and smart card that can be used in the present invention.

FIG. 2 shows a smart card reader 40 and a smart card 42 and a token reader 43 with a USB smart card token with USB type A male connector and showing the USB smart card SIM module 20a. The smart card contains a smart card module 20 as described earlier. The smart card plugs 42 into the smart card reader 40. The smart card reader 40 has connecting contacts of a pass-through connector 44 that connect the smart card module contacts C1–C8 to a USB cable 46 terminated by a USB series A plug 48. The USB series A plug connects to a USB Hub port 50 on a Host PC 52 or other USB hub. The PC as a host computer 52 also includes parallel and serial ports 54,56 and may include Ethernet, Bluetooth, Firewire and other similar functional items. A LED 60 is mounted on the USB card reader 40 in addition to the pass-through connector 44. No other active components are required with this USB smart card reader 40. The USB compatible smart card 42 is inserted in the USB style smart card reader 40, which is terminated by the USB series A plug connector 48. This combination constitutes a USB smart card device (USD), and will be used throughout this description. It should be understood that the present invention, as will be described in detail below, is not limited to the USD as just described.

Figure 3:
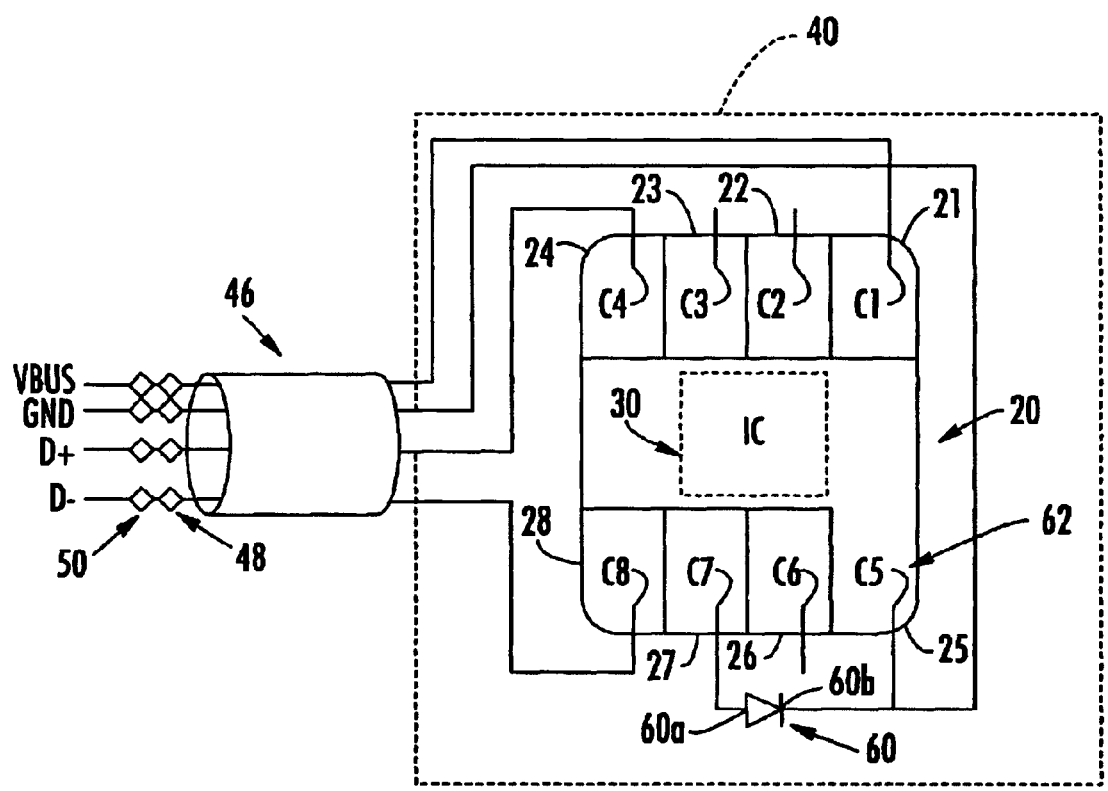
FIG. 3 illustrates a USB interface connection between a USB smart card module and a USB port using a cable and driving an LED to indicate USB traffic.

FIG. 3 shows a USB interface connection between a USB smart card module 20 and a USB port 50 using a cable 46 and driving the LED 60 to indicate USB traffic activity. Eight pass-through connector pins 62 within the smart card reader 40 connect to the contacts C1–C8 on the smart card module 20. The electrical connections from the smart card module 20 are carried via the cable 46 to the USB Series A plug connector 48. The USB compatible smart card module 20 is inserted in the USB style smart card reader 40 equipped with the USB cable 46 terminated by the USB series A plug connector 48.

As known to those skilled in the art the cable 46 uses four wires for connecting the smart card module 20 to the plug connector, which plugs directly into the USB port 50 of a Host PC root hub equipped with a Series A receptacle or a USB port of a hub equipped with the same receptacle (FIG. 2). A hub could provide the VBus power supply connected to the contact C1. The GND reference voltage is connected to contact C5. The data line D+ is connected to contact C4. The data line D− is connected to contact C8. When a smart card 42 is connected to a USB interface, the smart card module contacts C2, C3, and C6 are not assigned.

In FIG. 3, the anode 60a of the LED 60 is connected to contact C7 and the cathode 60b is connected to the GND reference voltage and C5 of the smart card module. A USB style card reader will normally provide these signals to the smart card module according to the electrical and transmission protocols defined in the USB specification.

It should be understood that it is possible to use a USB smart card module plug that can be separated from a USB smart card (FIG. 2). A smart card module can be positioned on a smart card module plug as another form factor of a USB smart card. When the smart card module plug is separated from a smart card, it may be inserted into a USB token reader. Token readers and module plugs are widely used in SIM applications designed for GSM telephones. A connector will plug directly into a USB port of a Host PC root hub equipped with a Series A receptacle or a USB port of a hub equipped with the same receptacle. For purposes of description, the term "smart card" as used herein can also refer to use of tokens, modules and other similar devices.

Figure 4:
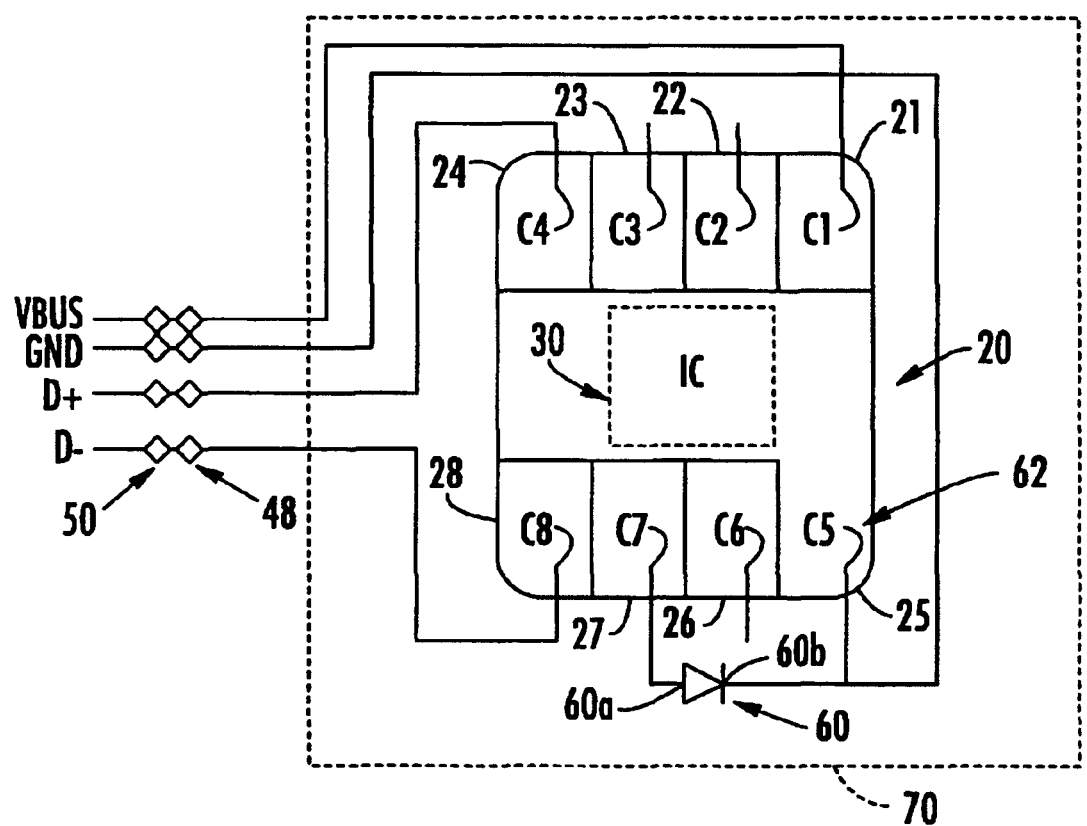
FIG. 4 is a USB interface connection between a USB smart card module within a token reader and a USB port using a plug connector and driving an LED to indicate USB traffic.

FIG. 4 shows a USB interface connection between a USB smart card module 20 within a token reader 70 and a USB port using a plug connector and driving the LED to indicate USB traffic activity. Eight pass-through connector pins 62 within the token reader 70 connect to the contacts C1–C8 on the USB smart card module. The electrical connections from the USB smart card module 20 are connected to a USB Series A plug connector 48.

The USB compatible smart card module is inserted in a USB style token reader terminated by the USB series A plug connector. The hub provides the VBus power supply connected to the contact C1 on the smart card module, the GND reference voltage connected to the contact C5 on the smart card module, the data signal D+ connected to the contact C4 on the smart card module, and the data signal D− connected to the contact C8 on the smart card module. The LED is connected as described before. Naturally, a USB style token reader will normally provide signals to the smart card module according to the electrical and transmission protocols defined in the USB specification.

It is possible to bias the LED by a current source circuit as part of the IC 30 mounted on the smart card module 20 such as shown in FIGS. 9–12 of the incorporated by reference WO 02/23357 publication. A current mirror circuit could use NMOS transistors that enable the current in the LED to be determined by the current into an NMOS transistor, which is proportional to the current through another NMOS transistor that flows through the LED. One NMOS transistor would be connected between the contact C7 and contact C5. The LED could be connected between the supply voltage VBus and contact C7. The anode of the LED would connect to VBus and the cathode of the LED would connect to contact C7. The current through the LED would determine the brightness of the LED and would be a function of the amount of USB traffic.

Figure 5:
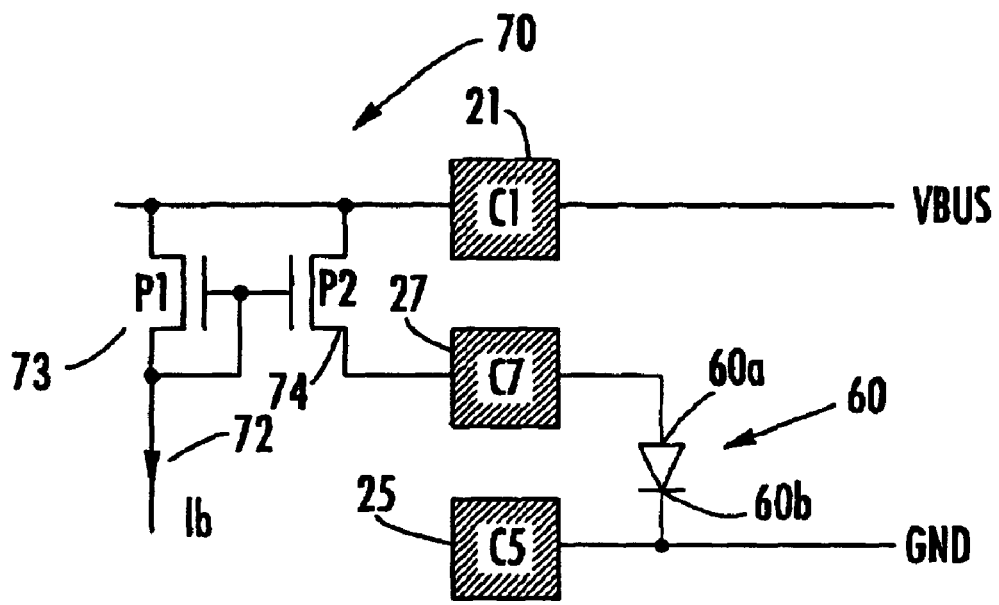
FIG. 5 is a schematic circuit diagram of a USB traffic signaling LED biased by a current source from VBus.

FIG. 5 shows an electrical schematic of a USB traffic signaling LED biased by a current source from contact C1 that can be used for the present invention. The current source circuit is part of the IC 30 mounted on the smart card module 20. The mirror circuit 70 includes PMOS transistors 73,74 that enable the current in the LED to be determined by the current 72 into the PMOS transistor 73, such that the current 72 into the PMOS transistor 73 is proportional to the current through the PMOS transistor 74 that flows through the LED. The PMOS transistor 74 is connected between the I/O contact and the contact C1.

The LED is connected between the GND reference voltage and the contact C7. The anode of the LED is connected to the contact C7 and the cathode of the LED is connected to GND reference voltage. The current through the LED determines the brightness of the LED and is a function of the amount of USB traffic. In the enhanced logic circuit of the present invention, variations in the modulation of the signaling are accomplished.

Figure 6:
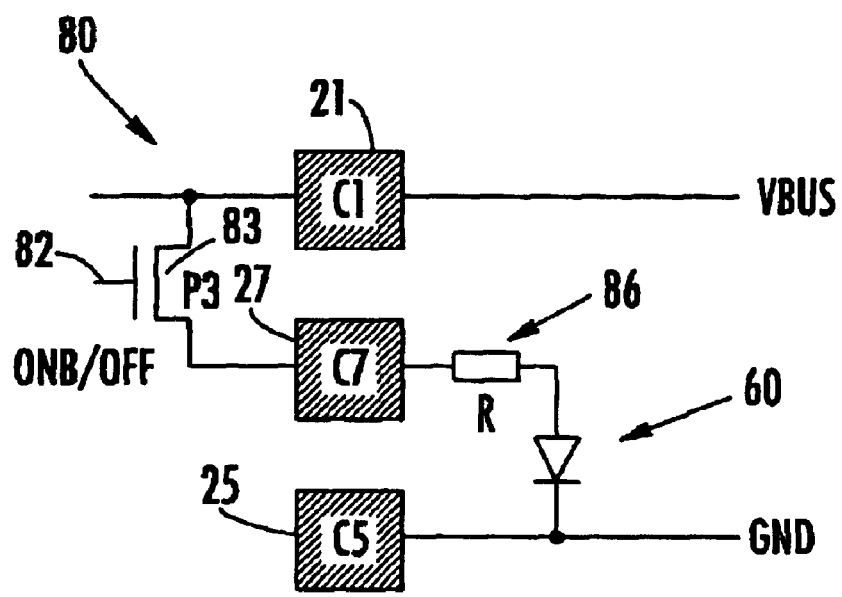
FIG. 6 is a schematic circuit diagram of the USB traffic signaling LED enabled by a switch to VBus.

FIG. 6 is an electrical schematic of a USB traffic signaling LED 60 enabled by a switch from contact C1. The switch circuit is part of the IC 30 mounted on the smart card module 20. The switch circuit 80 includes a PMOS transistor switch 83 connected between the contact C7 and the contact C1. A series circuit as the LED 60 and a resistor 86 is connected between the GND reference voltage and the contact C7. The cathode of the LED connects to GND reference voltage. When a negative voltage is applied to the gate 82 of the PMOS transistor 83, it is switched on, causing current to flow from the contact C7 through the resistor 86 and the LED to the GND reference voltage. The resistor limits the current through the LED. The modulation of the voltage at the gate of the PMOS transistor is a function of the USB traffic, making the brightness of the LED, a function of the amount of USB traffic.

It is also possible that the USB traffic signaling LED can be enabled by a switch to the contact C5. Although this switch circuit is operable for traffic signaling, by using the enhanced logic circuit of the present invention described below, variations in the modulation for the signaling are accomplished.

Figure 7:
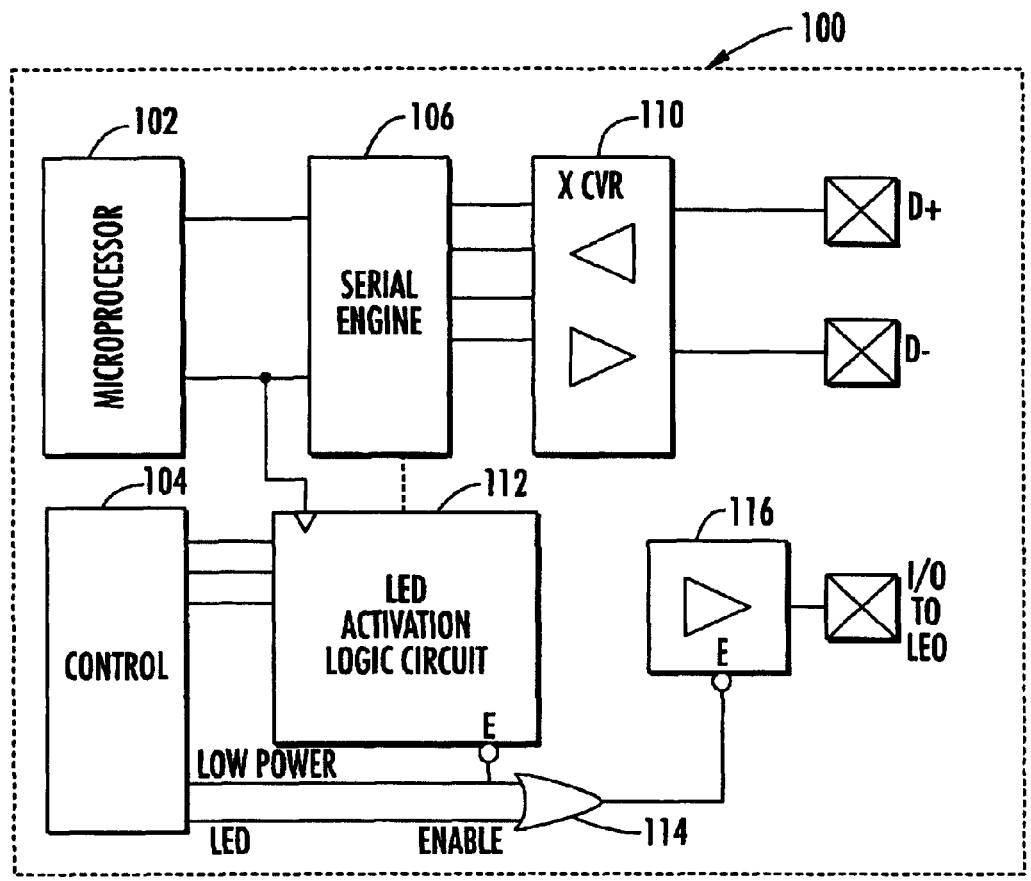
FIG. 7 is a block diagram of an integrated circuit having USB transceivers and USB LED activation logic circuits in accordance with the present invention.
Figure 8:
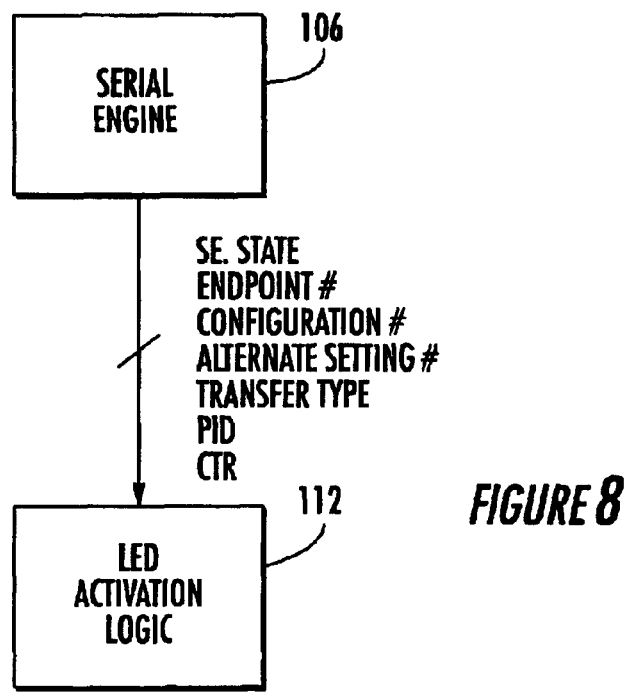
FIG. 8 is a simplified block diagram of part of the circuit of FIG. 7 Showing a serial engine operative with the LED activation logic circuit.

FIGS. 7 and 8 illustrate a block diagram of the IC for the smart card module of the present invention that has enhanced LED activation logic, including hardware logic and embedded software to enhance USB traffic signaling beyond a simple "correct transfer" (CTR) indication from an LED. In the previous circuit disclosed in the incorporated by reference WO 02/23357 reference, USB transceivers and USB traffic signaling circuits were operative such that the USB transceiver received differential signals D+ and D− and conmunicated with a serial engine that exchanged data with a microcontroller. Software was stored in a memory.

When a USB packet was transferred upstream or downstream with success, a correct transfer (CTR) signal would exist between the serial engine, microcontroller and counter and would be set by the hardware. A successful transfer occurred when no error was detected in a packet transfer. The software would clear the CTR signal once a CTR interrupt was serviced by the microcontroller. The counter had ten stages. The software program stored in memory caused the microcontroller to select an appropriate output of the counter via a select signal. A selected output of the counter would activate the LED driver connected to an input/output (I/O) pad.

The block diagram for the IC 100 shown in FIG. 7 is an example of an IC that can be used with the present invention to provide not only enhanced traffic signaling, but also an LED enable/disable and low power control. A microprocessor 102 is operatively connected to a control circuit 104 and a serial engine 106. The transceiver 110 is operatively connected to D+ and D− to receive differential serial signals D+ and D−. The transceiver 110 communicates with the serial engine 106. The control circuit 104 is operatively connected to an LED activation logic circuit 112 that receives signals from the microprocessor 102 and the control circuit 104. The control circuit 104 is operative to output a low power signal (low pow) and LED enable signal (LED enbl) into a logic gate 114 and to driver circuit 116 that is connected to the input/output pad 118, which in turn, is connected to an LED 60. The low power signal from control circuit 104 is operative with LED activation logic circuit 112 as illustrated.

The control circuit 104 and LED activation logic circuit 112 have one functional circuit that includes masks as necessary for host-only traffic fox OUT transfers; device-only traffic for IN transfers; host and device traffic for correct transfer (CTR) signals; disabled signaling O/P for power saving, such as operative with low power signals; bus error signals for stall, retries, aborts and similar functions; a protocol handshake for ACK; a device busy, i.e., a NAK; a transmission mode type, i.e., CTL, BLK, ISO, or INT; end point; configuration; and alternate settings.

As shown in FIG. 8, the serial engine 106 can also be operative with LED activation logic circuit 112 for SE-state, end point number, configuration number, alternate settings (such as for interfaces), transfer type, packet ID and correct transfer.

The addition of hardware logic and embedded software for these functions makes it possible to enhance the concept of USB traffic signaling well beyond a simple LED signal indicating that a "correct transfer" of a packet has occurred. Signaling attributes are no longer indicative of only a "correct transfer," but could be indicative of other meanings as well, including, but not limited to:

a) Host+Device traffic (i.e., CTR as before);
b) Host−only traffic (i.e., OUT transactions);
c) USD−only traffic (i.e., IN transactions);
d) Bus error conditions (i.e., STALL, NAK, retries, aborts, etc.); and
e) Device busy conditions (i.e., NAK, processing last cmd, etc.).

In accordance with the present invention, signaling attributes can be related to specific aspects of the USB transmissions or device configuration, including but not limited to:

a) By USB Transfer Type (i.e., CTL, INT, ISO, BULK);
b) By Endpoint (i.e., EP0 arid/or EP2, etc.);
c) By Configuiation (i.e., CONFIG0, CONFIC1, etc.);
d) By Alternate Settings (i.e., AS0 and/or AS1, etc.); and
e) By Vendor-Specific Request.

Overall power consumption of the device can be minimized in cases where it is essential to conserve power. For example, the LED activation logic circuit 112 of the present invention can generate a disable signal to counters, buffer and related logic. The LED is forced inactive, either by "floating" the appropriate "enable" signal or forcing the "enable" signal to the same state as an opposing terminal.

Microprocessor writable counters in the LED activation logic circuit 112 or other hardware components would broaden control over how the LED is enabled or disabled. For example, a LED "on" time would no longer be fixed to the microprocessor interrupt service. An LED "off" time would no longer be fixed to the frequency of "correct transfers" as detected. The USB traffic signaling can use an unused contact C7 of the smart card module 20, which is connected to the LED 60, external to the chip. One other component that may be required, depending upon the design of the IC chip and associated circuits, may be a current limiting resistor. The "brightness" and "duration" of the LED can be modulated as a function of USB traffic, between the device and the USB host.

In order to maintain backwards compatibility with the existing ISO 7816 pin assignments of a smart card module, such as illustrated in FIG. 1 and correlated in Table 1 below, three of the currently unused pads can be selected for use in the universal serial bus (USB) applications. This allows the embedded smart card chip to be used in either the ISO or the USB environment with minimal complications induced by use of previously defined pads.

TABLE 1

Pinouts of Smart Card Module

| Module Pad | ISO Assignment | USB Assignment |
|---|---|---|
| C1 | Vcc | VBus |
| C2 | Reset | — |
| C3 | Clock | — |
| C4 | RFU | D+ |
| C5 | GND | GND |
| C6 | Vpp | — |
| C7 | I/O | — |
| C8 | RFU | D− |

As noted before, a "dual mode" smart card device can also be used and includes the smart card chip embedded within the traditional smart card module and micro-wired to the eight external pads. This module is embedded into a smart card. When used in the USB context, a simple pass-through reader is only required to connect the appropriate module pad to the appropriate USB signal. In a minimal configuration of a USB context, the USB D+ and D− signals are mapped to the previously RFU'd pads C4 and C8 and VBus and GND are mapped to pads C1 and C5, respectively.

Optionally, a smart card module may be scribed from the body of the smart card, allowing it to be broken loose of the larger card, and inserted into a USB token reader, as known to those skilled in the art.

In USB-only context, it is not necessary to maintain backwards compatibility with the ISO 7816-1 physical characteristics and 7816-2 contacts description. The smart card chip can be packaged in similar fashion to the dual-mode variety, but assignment of external connectivity is not constrained in the same fashion as the dual-mode smart card. As with the dual-mode USB smart card device (USD), minimal connectivity with the outside world maximizes the level of security of the device against outside attacks.

The additional versatility of the visual indication of activity of the USD is accomplished with the addition of a minimal amount of logic and control as described above.

The addition of a microprocessor controlled preload function to a traffic counter (e.g., scaling counter) as part of or separate from LED activation logic circuit and/or driver counter 116, makes it possible to vary the signaling rate, "on-the-fly" for particular segments of USB traffic activity. Used in conjunction with an application specific purpose brings additional meaning to the visual cues of the LED.

A microprocessor managed enable signal can be gated with the output signal from a scaling counter. This would provide control under appropriate conditions. The addition of a microprocessor managed enable signal, which can be gated with the output signal from the scaling counter, and/or with the enable of the counter itself, can disable the LED activity and reduce power consumption.

The addition of one or more microprocessor managed real-time loadable preload registers to any counters or timers of LED activation logic circuit 112 and driver/counter 116 would allow additional context sensitive information to be conveyed by means of the LED. The addition of a multiplexer circuit with a microprocessor managed selection signal would allow different meanings of the enabled LED besides simply the presence of bus traffic.

Additional logic to gate various state information from the embedded USB device controller state machine and status registers would result in control signals to the "on" and "off" counters, such as a counter clock, reload, enable, reset, clear, or inhibit.

The addition of a microprocessor managed look-up table operative as part of the LED activation logic circuit or other circuits and using, for example, the functional logic mentioned previously, provides numerous configurations to describe the signaling behavior. Addressing of such a look-up table could, for example, be accomplished by rows and columns driven by PID/VSR (packet ID/vendor specific request), endpoint number, correct transfer, serial engine state, transfer type and similar items. Outputs from the control logic or look-up table would include such information as LED active, LED enable, LEDdriverEN, and similar items.

Microprocessor managed control registers could be used to manage the functionality of the LED LUT/logic, LED driver and similar functions. For example, for low power applications, where signaling is not desired, a control bit low power may be cleared, forcing all counters to stop, and any LED output buffer to disable.

A microprocessor managed control register of "N" undefined bits could be used to facilitate selection of inputs to a look-up table or "pages" of look-up Lables, depending on USB configuration or alternate setting, endpoint numbers, or vendor specific request (VSR), in order to select the appropriate application specific signaling.

It should be understood that it is possible to have more than one application accessing the USB smart card device at one time, taking advantage of the available USB bandwidth and scheduling, the smart card chip operating system, and vendor specific applications, both running within the embedded chip and on a host computer. However, such contexts necessitate distinction between one application's use of the traffic signaling, and another application's use of the traffic signaling. These might be distinctly different, and thus, might require different criteria for signaling to occur, if at all. This is most likely to be managed by using different USB configurations or alternate settings.

Referring now to FIGS. 9–14, there are illustrated in block format various USB transactions and transfers and showing the type of USB transactions and transfers that can be signaled using the programmable logic of the present invention for "on-the-fly" programming by a USB smart card device. The solid lines refer to the USB host and the dotted lines refer to the physical Device.

It should be understood that the first column refers to the token packet/PID, i.e., packet ID. The second column refers to the data packet and the third column refers to the handshake packet as used in the USB transaction.

For purposes of definition, various packet ID types used in the USB system are identified below.

| | |
|---|---|
| Tokens: | SETUP — Address + endpoint number in host-to-function transaction for SETUP to a control pipe |
| | OUT — Address + endpoint number in host-to-function transaction |
| | IN — Address + endpoint number in function-to-host transaction |
| | SOF — Start-of-frame marker and frame number |
| Data: | DATA0 — Data packet PID even |
| | DATA1 — Data packet PID odd |
| Handshake: | ACK — Receiver accepts error-free data packet |
| | NAK — Receiver device cannot accept data or Tx device cannot send data |
| | STALL — Endpoint is halted or a control pipe request is not supported |
| Special: | PRE — Host issued preamble; enables downstream bus traffic to low speed devices |

Figure 9:
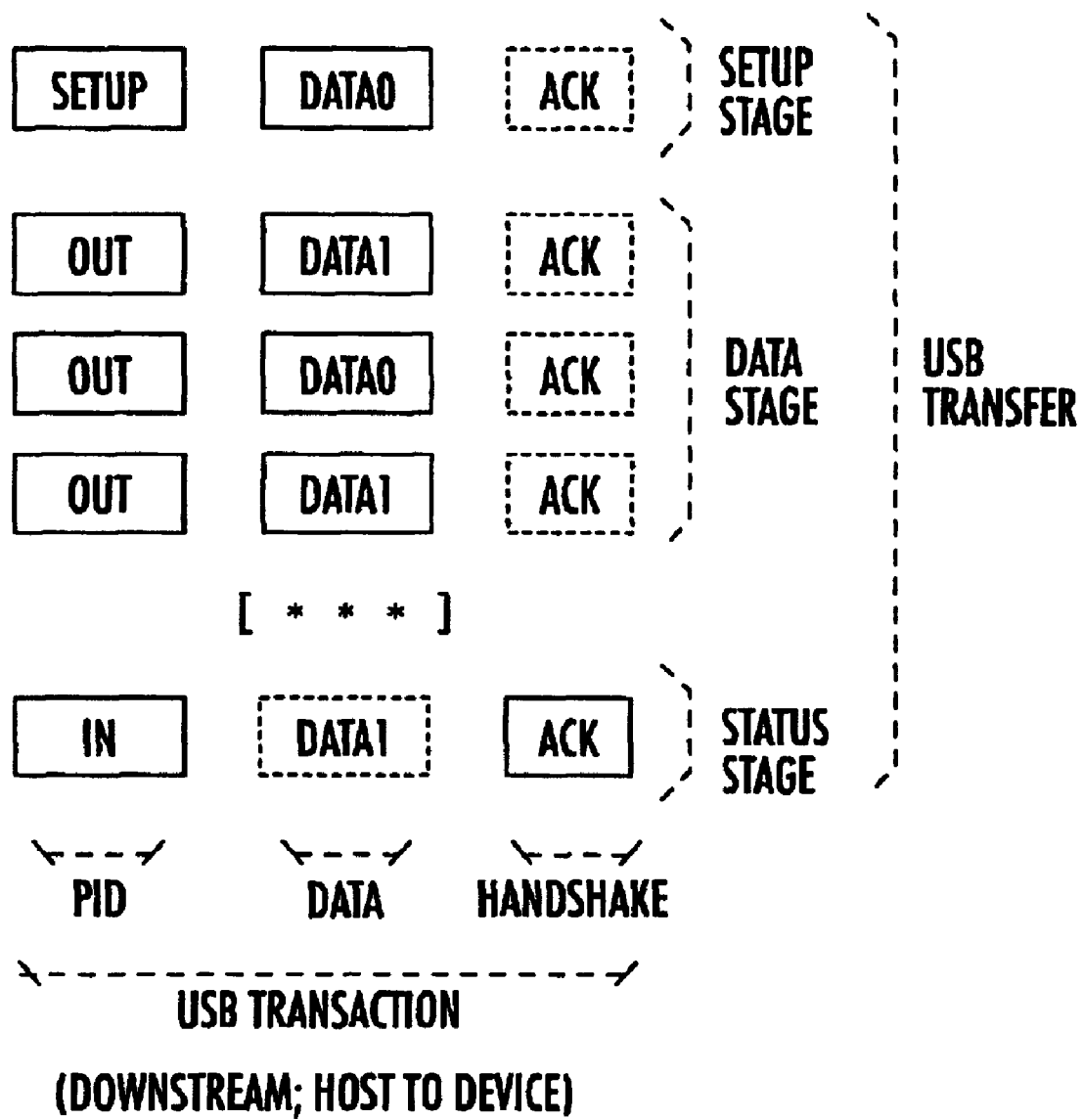
FIGS. 9–14 are diagrams illustrating high level USB transactions and packet transfers between a USB host and device, as examples of activities that vary a visual indicator (such as the LED) of the traffic signaling.
Figure 10:
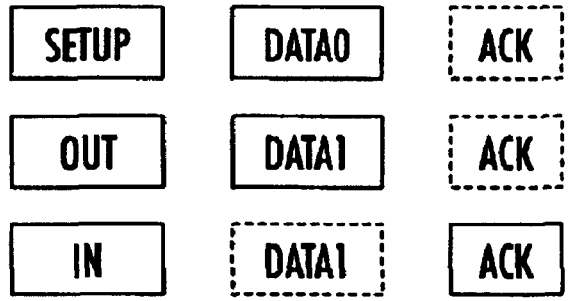
Figure 11:
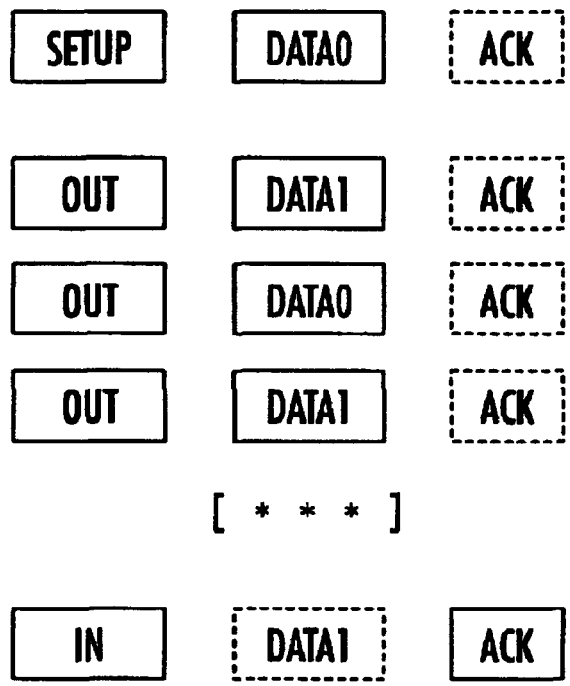

FIG. 9 illustrates a downstream USB transaction from host to device in a USB control mode. FIG. 10 illustrates a typical USB control mode downstream transaction with a single data stage payload, and FIG. 11 illustrates a multiple data stage payload.

Figure 12:
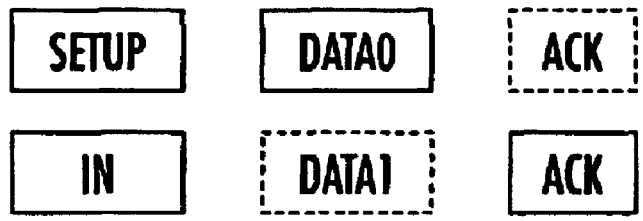
Figure 13:
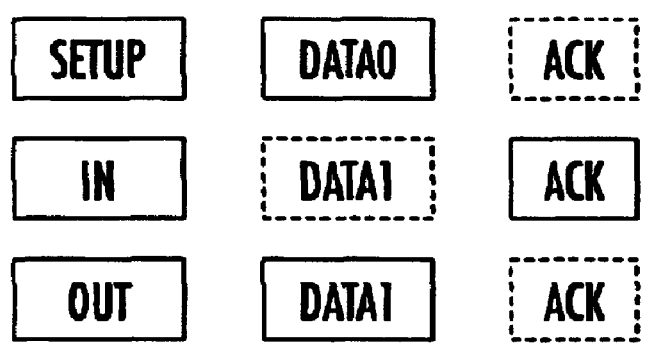
Figure 14:
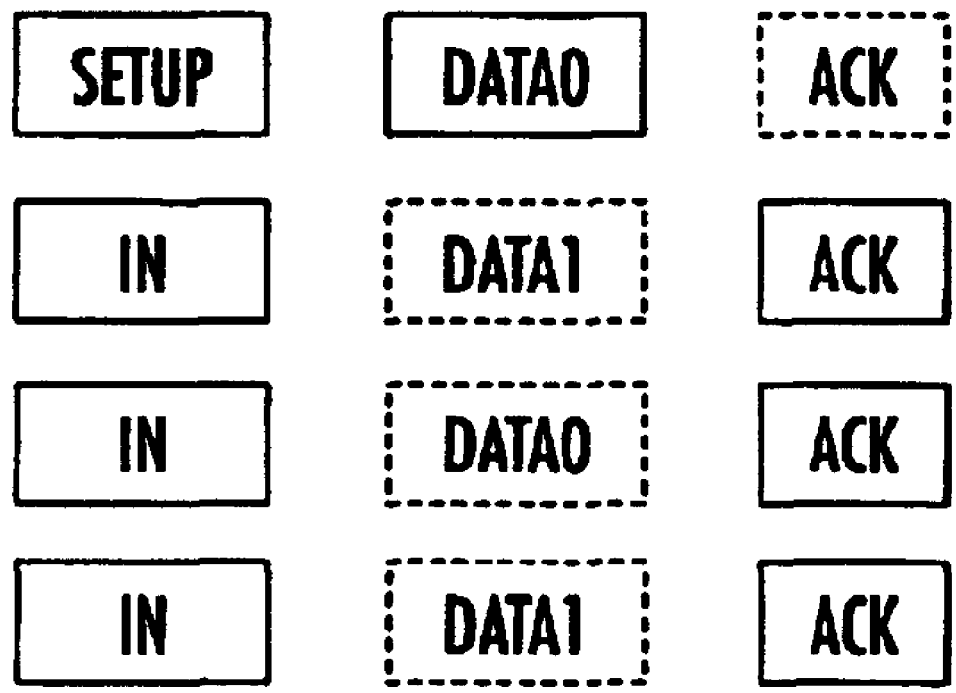
Figure 14:

FIG. 12 illustrates a zero data transaction with no data stage payload sent to the device. FIGS. 13 and 14 show an upstream transaction from the device to the host in the USB control mode, where FIG. 13 shows a single data stage payload and FIG. 14 shows multiple data stage payloads.

Figure 15:
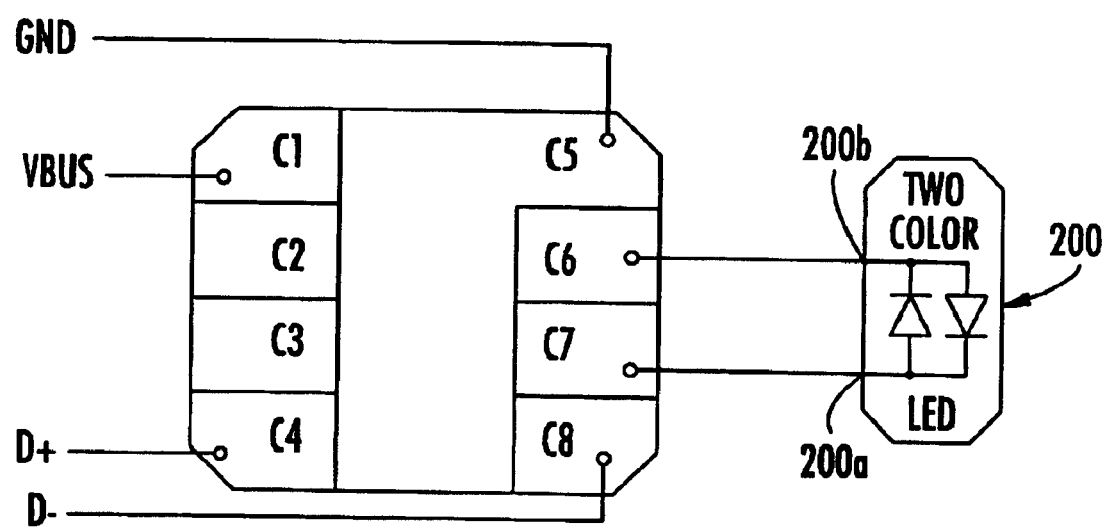
FIG. 15 is a high level block circuit diagram of a two-color LED connected to smart card module pads C6 and C7 for enhanced visual feedback of traffic signaling for an active USB smart card device.
Figure 16:
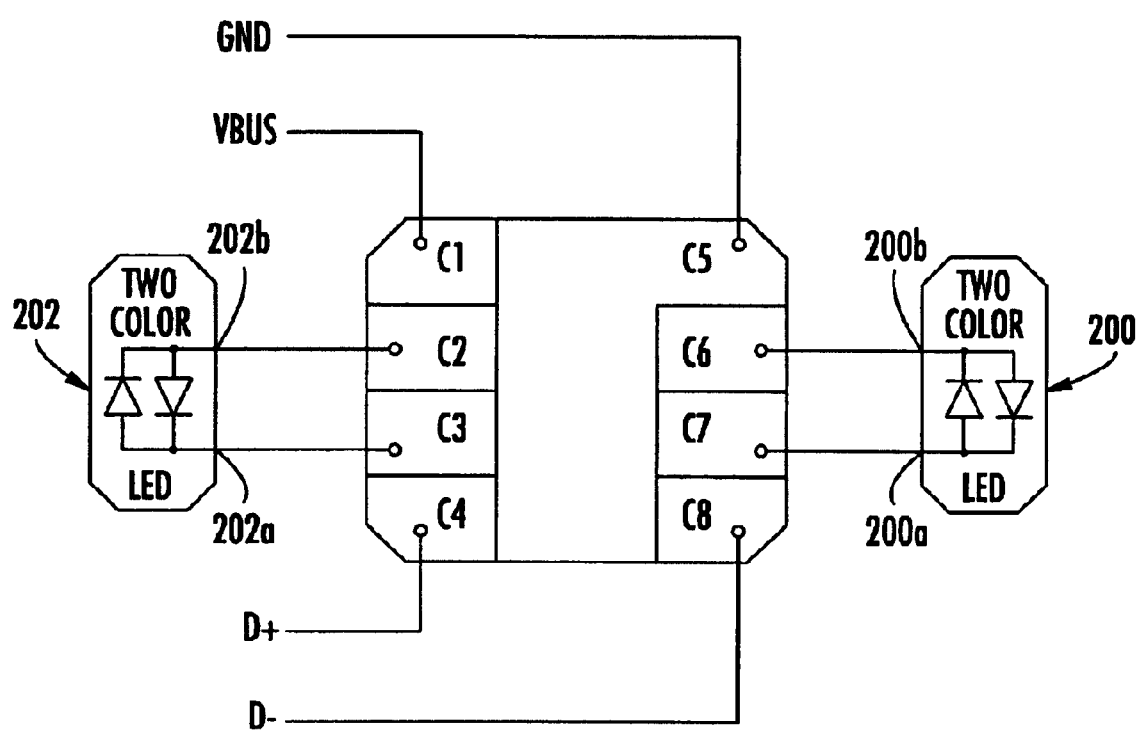
FIG. 16 is a high level block diagram similar to FIG. 15, but showing two, two-color LEDs respectively connected to pads C2 and C3 and pads C6 and C7.

FIGS. 15 and 16 illustrate the USB smart card device or similar smart card device having enhanced visual feedback. The active USB smart card device could be incorporated into other smart card devices.

As noted before, the addition of one or more I/O contacts from the smart card chip to the smart card module, and the addition of the programmable internal registers and counters in the LED activation logic circuitry, provides an opportunity to greatly increase the versatility and degree of visual information conveyed from the USB smart card device (USD) for any given application. Beyond indicating basic parameters, such as the proper physical interconnection of the USD into the bus, device utilization, and relative amount of USB traffic, the extended functionality would make it possible to indicate a variety of other value added visual information. These indications could include:

a) Traffic signaling on a per application basis;
b) Differentiation between inflowing and outflowing traffic;
c) Visual cues to an end-user with special signaling patterns;
d) Diagnostic information for development and debug;
e) Internal process status, such as during relatively long periods where the USD is busy with internal computations; and
f) Visual cues by mixing two different meanings together, using color assignment to distinguish one from the other.

Given the constraints from "legacy" ISO 7816, it is also possible to use more than one of the currently used module pads as noted in Table 2 for different components, such as two-color LED's or other signaling devices.

TABLE 2

Pinouts of Smart Card Module

| Module Pad | ISO Assignment | USB Assignment | A Possible Assignment |
|---|---|---|---|
| C1 | Vcc | VBus | VBus |
| C2 | Reset | — | IO4 |
| C3 | Clock | — | IO3 |
| C4 | RFU | D+ | D+ |
| C5 | GND | GND | GND |
| C6 | Vpp | — | IO2 |
| C7 | I/O | — | IO1 |
| C8 | RFU | D− | D− |

Combined with the additional external logic, it is possible to arrive at different implementations by using all four of the pads that are currently unused when a module is used in USB applications. With respect to cost-effectiveness and efficiency, a specific implementation is possible where there is no additional componentry beyond an LED, and possibly a current limiting resistor similar as described before. Such parts are most likely to be sufficient in applications where it is very much a factor of the complete application.

In order to maintain backwards compatibility with ISO 7816 pin assignments of the smart card module, one of the pins that is unused in the USB environment is used to provide a second I/O. As Vpp is now generally considered "legacy," this pin is now unused.

Conversely, and at some added expense, the ISO pads for reset and clock could be also used, with attention paid to proper internal switching and timing. The circuit is completed by connecting the anode 200*a* of a two-color LED 200 to smart card module pad C7, and the cathode 200*b* of the same two-color LED 200 to pad C6. Conversely, the leads of the LED could be connected opposite, thus, reversing the meanings of the colors.

A second two-color LED 202 could be added as shown in FIG. 16. The anode 202*a* of two-color LED 202 is connected to pad C3 and cathode 202*b* is connected to pad C2.

Internal to the smart card chip, circuitry would determine the relative brightness of the LED (as a function of what one or both of the colors is intended to reflect). Circuitry is included to generate and buffer the signal which is presented onto the exterior pad. For highly repetitive activities (i.e., "correct transfer"), the counter can be used to scale the relative volume, in order to make it visible to an observer of the LED device.

For less frequent activities, a duration limited signal may be generated in order to make the LED more visible to an observer. The onboard microprocessor can load any prescaling values into related logic for finer control and enabling of the signals, which are ultimately presented to the module pad. Because either LED within the two-color LED package is activated by a voltage differential between the two pins, internal logic is incorporated to negotiate the proper timing at which one or the other or neither LED is activated. The use of one or two color LED's can be used to signal operational attributes of the smart card and/or transactions between the smart card and USB port of the USB host. By using a combination of different colors, signaling modulation of the LED's or other factors, it is possible to determine visually the different attributes such as host OUT transactions, smart card IN transactions, USB error conditions, busy conditions, USB transfer type, endpoints, configuration, alternate settings, and vendor specific requests. Disable signals can be generated to one or both two-color LED'S.

Figure 17:
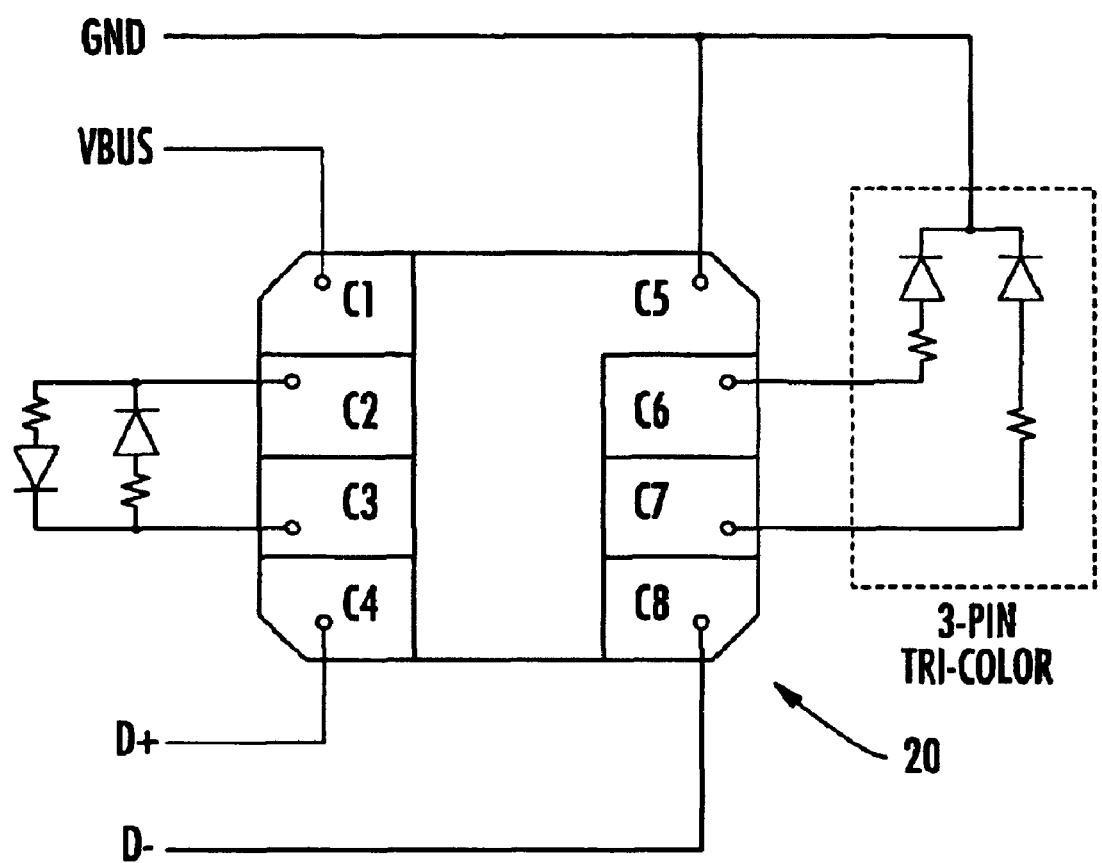
FIGS. 17–19 are other LED configurations with FIG. 17 showing a three-pin, tri-color LED and FIG. 18 showing another example using three-pin, tri-color LED and FIG. 19 showing a broad spectrum (R-G-B), four-pin LED module.
Figure 18:
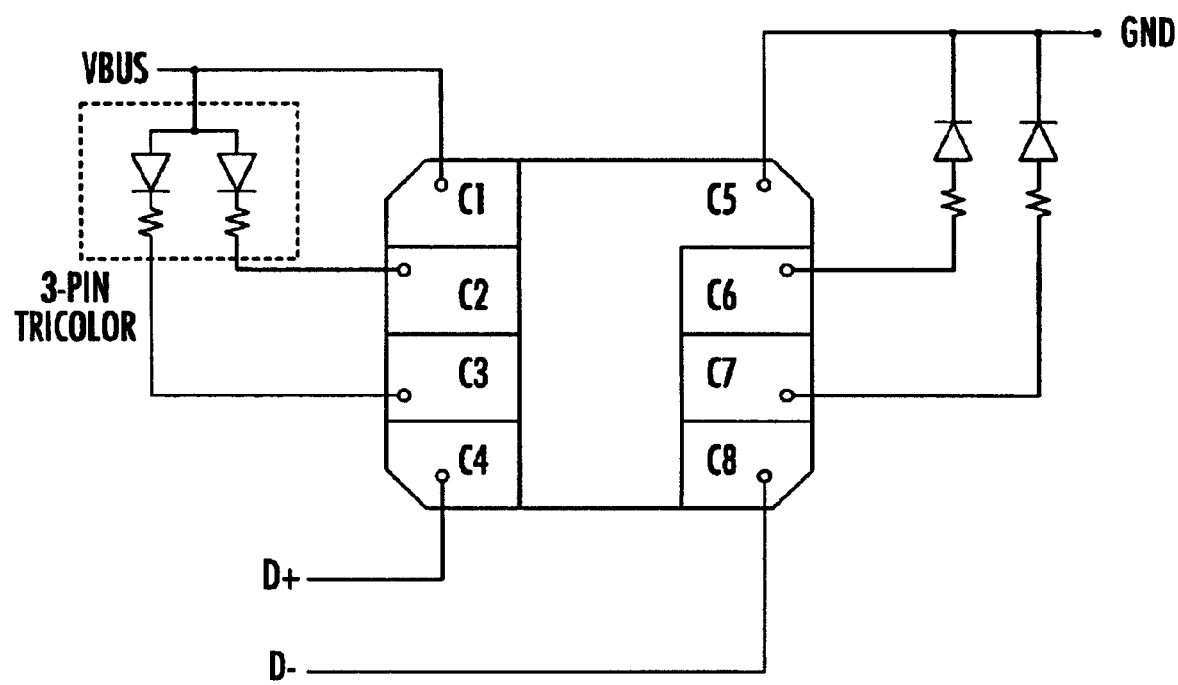
Figure 19:
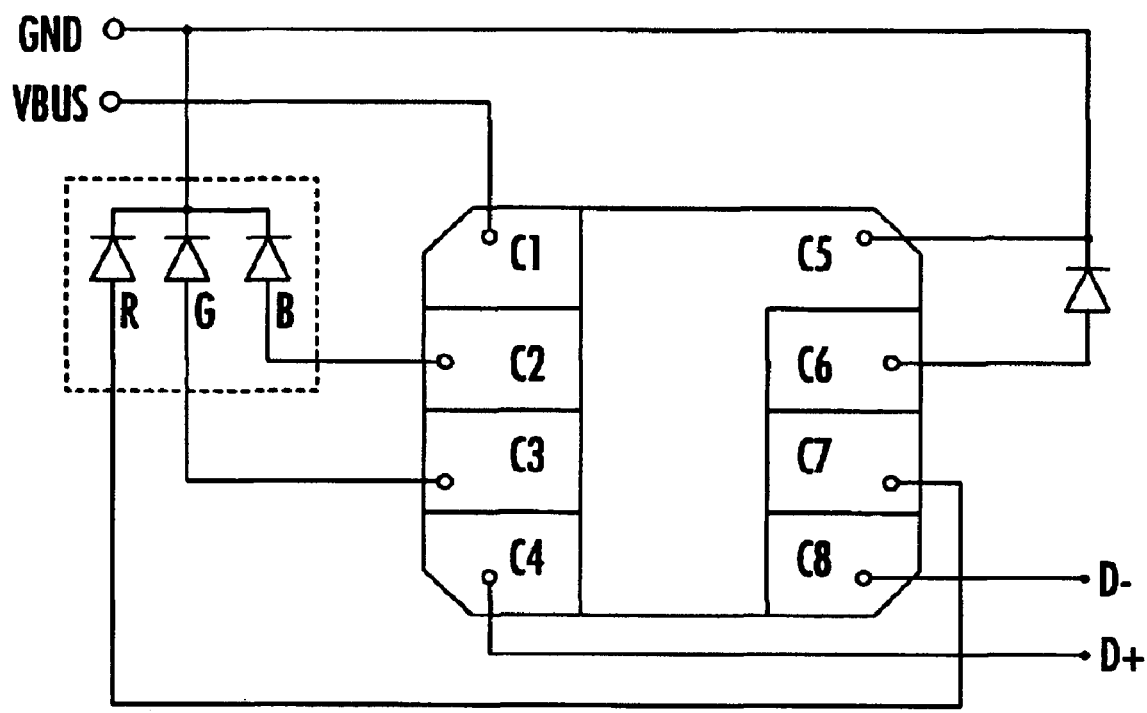

FIGS. 17–19 are other examples of LED configurations. FIG. 17 shows a two-pin LED on the left side connected to contacts C2 and C3 and a three-pin, tri-color LED on the right side connected to contacts C6 and C7. FIG. 18 shows a three-pin, tri-color LED, two LED's on the left connected to contacts C2, C3 and connected to Vbus. On the right, separate LED's are connected to contacts C6 and C7. FIG. 19 shows a broad spectrum (R-G-B) four-pin LED module with respective R,G,B LED's connected to respective contacts C2, C3 and C7. Any combination is possible and the limitations are only imposed by the USB specification with regards to power consumption by a USB device. The power consumption could be minimized by using an external amplifier, which in turn drives the light-emitting diodes. It is also possible to use a self-powered "pass-thru" reader. The three-pin, tri-color LED produces a three-color output. It is also possible to use quad-color LED's.

Thus, it is possible to use tri- or multi-color LED packages having a tri-color output with one or two bi- or tri-color LEDs added as in the described figures above for FIGS. 17–19. Thus, it is possible to connect on one side to contacts C2, C3, C6 or C7, or C1 or C5 depending on the configuration. It is even possible to use four LEDs that connect to unused input/output pads for a quad-color LED or full-spectrum LED as noted above.

This application is related to copending patent application entitled, "SMART CARD AND METHOD THAT MODULATES TRAFFIC SIGNALING INDICATIVE OF OPERATIONAL ATTRIBUTES OF THE SMART CARD AND/OR TRANSACTIONS BETWEEN THE SMART CARD AND USB PORT OF A USB HOST," which is filed on the same date and by the same assignee and inventor(s), the disclosure which is hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A smart card comprising:
   a card body; and
   an integrated circuit carried by the card body and comprising a microprocessor for communicating with a host, an input/output terminal, and an LED activation logic circuit and driver counter operatively connected to said microprocessor and input/output terminal, and operative for driving at least one multi-color light emitting diode (LED) operatively connected to said input/output terminal and indicative of smart card transactions between the smart card and a USB port of the host, wherein one of at least said LED activation logic circuit and driver counter includes microprocessor controlled registers and/or counters, and operative for modulating the multi-color LED based on operational attributes of the smart card and/or transactions between the smart card and USB port of the host and allowing additional context sensitive information to be conveyed by the multi-color LED.

2. The smart card according to claim 1, wherein the card body includes contacts to which the multi-color LED is operatively connected when the smart card is inserted within a smart card reader.

3. The smart card according to claim 2, wherein the contacts to which the multi-color LED is operatively connected comprise a reset contact (C2), a clock contact (C3), an I/O contact (C6) or programming power connection Vpp contact (C7) according to the ISO 7816 specification for smart cards.

4. The smart card according to claim 2, and further comprising contacts on said smart card to which a second multi-color LED is operatively connected when the smart card is inserted within a smart card reader.

5. The smart card according to claim 4, wherein the contacts to which the at least one multi-color LED is connected comprise a reset contact (C2) and clock contact (C3) according to the ISO 7816 specification for smart cards.

6. The smart card according to claim 1, wherein the microprocessor is operative for modulating the at least one multi-color LED based on host OUT transactions.

7. The smart card according to claim 1, wherein the microprocessor is operative for modulating the at least one multi-color LED based on host IN transactions.

8. The smart card according to claim 1, wherein the microprocessor is operative for modulating the at least one multi-color LED based on USB error conditions.

9. The smart card according to claim 1, wherein the microprocessor is operative for modulating the at least one multi-color LED based on device busy conditions.

10. The smart card system according to claim 1, wherein the microprocessor is operative for modulating the at least one multi-color LED based on USB transfer type for the transaction.

11. The smart card according to claim 1, wherein the microprocessor is operative for modulating the at least one multi-color LED based on endpoints involved in a transaction.

12. The smart card according to claim 1, wherein the microprocessor is operative for modulating the at least one multi-color LED based on smart card configuration.

13. The smart card according to claim 1, wherein the microprocessor is operative for modulating the at least one multi-color LED based on alternate settings within the smart card.

14. The smart card according to claim 1, wherein the microprocessor is operative for modulating the at least one multi-color LED based on vendor specific requests.

15. The smart card according to claim 1, wherein the microprocessor is operative for driving the at least one multi-color LED to different colors based on operational attributes of the smart card and/or transactions between the smart card and USB port of the host.

16. A method for signaling different attributes of smart card transactions between a Universal Serial Bus (USB) smart card and USB port comprising the steps of:
   signaling a transaction between the smart card and USB port using a multi-color LED operatively connected to an LED activation logic circuit and driver counter, at least one of the LED activation logic circuit or driver counter having microprocessor controlled registers and/or counters; and
   modulating the at least one multi-color LED based on operational attributes of the smart card and/or transactions between the smart card and USB port of a host and allowing additional context sensitive information to be conveyed by the multi-color LED.

17. The method according to claim 16, and further comprising the step of connecting contacts located on the smart card to the at least one multi-color LED by inserting the smart card within a smart card reader.

18. The method according to claim 17, and further comprising the step of operatively connecting the at least one multi-color LED to a reset contact (C2), a clock contact (C3), an I/O contact (C6) or programming power connection Vpp contact (C7) according to the ISO 7816 specification for smart cards.

19. The method according to claim 17, and further comprising the step of connecting contacts located on the smart card to a second multi-color LED when the smart card is inserted within a smart card reader.

20. The method according to claim 17, and further comprising the step of operatively connecting the at least one multi-color LED to a reset contact (C2) and clock contact (C3) according to the ISO 7816 specification for smart cards.

21. The method according to claim 16, and further comprising the step of modulating the at least one multi-color LED based on host OUT transactions.

22. The method according to claim 16, and further comprising the step of modulating the at least one multi-color LED based on host IN transactions.

23. The method according to claim 16, and further comprising the step of modulating the at least one multi-color LED based on USB error conditions.

24. The method according to claim 16, and further comprising the step of modulating the at least one multi-color LED signaling based on device busy conditions.

25. The method according to claim 16, and further comprising the step of modulating the at least one multi-color LED based on USB transfer type for a transaction.

26. The method according to claim 16, and further comprising the step of modulating the at least one multi-color LED based on endpoints involved in a transaction.

27. The method according to claim 16, and further comprising the step of modulating the at least one multi-color LED based on a smart card configuration.

28. The method according to claim 16, and further comprising the step of modulating the at least one multi-color LED based on alternate settings.

29. The method according to claim 16, and further comprising the step of modulating the at least one multi-color LED based on vendor specific requests.

30. The method according to claim 16, and further comprising the step of disabling the at least one multi-color LED to conserve power by generating a disable signal to the at least one multi-color LED.

31. The method according to claim 16, and further comprising the step of signaling a transaction by driving the at least multi-color LED on and off based on a correct transfer of a packet between the USB port and the smart card.

32. The method according to claim 16, and further comprising the step of driving the at least one multi-color LED to different colors based on operational attributes of the smart card and/or transactions between the smart card and USB port of the host.

33. A smart card system comprising:
a smart card reader having at least one multi-color, light emitting diode (LED);
a smart card received within the smart card reader and comprising:
a card body; and
an integrated circuit carried by the card body and comprising a microprocessor for communicating with a host via the smart card reader, an input/output terminal, and an LED activation logic circuit and driver counter operatively connected to said microprocessor and input/output terminal, and operative for driving the at least one multi-color LED operatively connected to said input/output terminal and indicative of smart card transactions between the smart card and a USB port of the host, wherein one of at least said LED activation logic and driver counter includes microprocessor controlled registers and/or counters, and operative for modulating the at least one multi-color LED based on operational attributes of the smart card and/or transactions between the smart card and USB port of the host and allowing additional context sensitive information to be conveyed by the multi-color LED.

34. The smart card system according to claim 33, wherein the card body includes contacts to which the at least one multi-color LED is operatively connected when the smart card is inserted, within the smart card reader.

35. The smart card system according to claim 34, wherein the contacts to which the at least one multi-color LED is operatively connected comprises a reset contact (C2), a clock contact (C3), an I/O contact (C6), or programming power connection Vpp contact (C7) according to the ISO 7816 specification for smart cards.

36. The smart card system according to claim 34, and further comprising contacts on said smart card to which a second multi-color LED of the smart card reader is operatively connected when the smart card is inserted within the smart card reader.

37. The smart card system according to claim 34, wherein the contacts to which the at least one multi-color LED are operatively connected comprise a reset contact (C2) and clock contact (C3) according to the ISO 7816 specification for smart cards.

38. An integrated circuit comprising:
at least one card memory for storing a set of instructions related to initiating and completing smart card transactions between a Universal Serial Bus (USB) smart card and USB port of a host; and
a microprocessor connected to the at least one card memory for communicating with the host, an input/output terminal, and an LED activation logic circuit and driver operatively connected to said microprocessor and input/output terminal, and operative for driving at least one multi-color light emitting diode (LED) operatively connected to said input/output terminal and indicative of smart card transactions between the smart card and a USB port of a host, wherein one of at least said LED activation logic circuit and driver counter includes microprocessor controlled registers and/or counters, and operative for modulating the at least one multi-color LED based on operational attributes of the smart card and/or transactions between the smart card and USB port of the host and allowing additional context sensitive information to be conveyed by the multi-color LED.

39. The integrated circuit according to claim 38, wherein the card body includes contacts to which the at least one multi-color LED is operatively connected when the smart card is inserted within a smart card reader.

40. The integrated circuit according to claim 39, wherein the contacts to which the at least one multi-color LED is connected comprise an I/O contact (C6) and programming power connection Vpp contact (C7) according to the ISO 7816 specification for smart cards.

41. The integrated circuit according to claim 39, and further comprising contacts on said smart card to which a second multi-color LED is operatively when the smart card is inserted within a smart card reader.

42. The integrated circuit according to claim 39, wherein the contacts to which the at least one multi-color LED are connected comprise a reset contact (C2) and clock contact (C3) according to the ISO 7816 specification for smart cards.

43. The integrated circuit according to claim 38, wherein the microprocessor is operative for modulating the at least one multi-color LED based on host OUT transactions.

44. The integrated circuit according to claim 38, wherein the microprocessor is operative for modulating the at least one multi-color LED based on host IN transactions.

45. The integrated circuit according to claim 38, wherein the microprocessor is operative for modulating the at least one multi-color LED based on USB error conditions.

46. The integrated circuit according to claim 38, wherein the microprocessor is operative for modulating the at least one multi-color LED based on device busy conditions.

47. The integrated circuit according to claim 38, wherein the microprocessor is operative for modulating the at least one multi-color LED based on USB transfer type for a transaction.

48. An integrated The integrated circuit according to claim 38, wherein the microprocessor is operative for modulating the at least one multi-color LED based on endpoints involved in a transaction.

49. The integrated circuit according to claim 38, wherein the microprocessor is operative for modulating the at least one multi-color LED based on smart card configuration.

50. The integrated circuit according to claim 38, wherein the microprocessor is operative for modulating the at least one multi-color LED based on alternate settings within the smart card.

51. The integrated circuit according to claim 38, wherein the microprocessor is operative for modulating the at least one multi-color LED based on vendor specific requests.

52. The integrated circuit according to claim 38, wherein the microprocessor is operative for disabling the at least one multi-color LED by generating a disable signal to the signaling device.

* * * * *